United States Patent
Nagata et al.

(10) Patent No.: US 10,801,977 B2
(45) Date of Patent: Oct. 13, 2020

(54) RADIATION ANALYZING APPARATUS AND RADIATION ANALYZING METHOD

(71) Applicant: HITACHI HIGH-TECH SCIENCE CORPORATION, Minato-ku, Tokyo (JP)

(72) Inventors: Atsushi Nagata, Tokyo (JP); Satoshi Nakayama, Tokyo (JP); Keiichi Tanaka, Tokyo (JP); Kazuo Chinone, Tokyo (JP)

(73) Assignee: HITACHI HIGH-TECH SCIENCE CORPORATION (JP)

( * ) Notice: Subject to any disclaimer, the term of this patent is extended or adjusted under 35 U.S.C. 154(b) by 737 days.

(21) Appl. No.: 15/465,910

(22) Filed: Mar. 22, 2017

(65) Prior Publication Data
US 2017/0276621 A1 Sep. 28, 2017

(30) Foreign Application Priority Data

Mar. 24, 2016 (JP) .................................. 2016-059811

(51) Int. Cl.
*G01N 23/223* (2006.01)

(52) U.S. Cl.
CPC ....... *G01N 23/223* (2013.01); *G01N 2223/33* (2013.01)

(58) Field of Classification Search
CPC ..... G01N 2223/3301; G01N 2223/316; G01N 2223/076; G01N 2223/321; G01N 2223/33; G01N 23/223
See application file for complete search history.

(56) References Cited

U.S. PATENT DOCUMENTS

| 6,337,897 | B1* | 1/2002 | Kawahara | G01N 23/223 378/148 |
| 6,479,818 | B1* | 11/2002 | McCarthy | G01N 23/083 250/307 |
| 7,289,597 | B2* | 10/2007 | Sasayama | G01N 23/2252 378/43 |
| 2002/0071519 | A1* | 6/2002 | Satoh | G01N 23/223 378/49 |
| 2005/0184238 | A1* | 8/2005 | Odawara | G01T 1/1606 250/336.2 |
| 2006/0104419 | A1* | 5/2006 | Sasayama | G01N 23/207 378/145 |

(Continued)

FOREIGN PATENT DOCUMENTS

| JP | 2005257349 | 9/2005 |
| JP | 2008203245 | 9/2008 |
| JP | 2015121479 | 7/2015 |

*Primary Examiner* — David J Makiya
*Assistant Examiner* — Soorena Kefayati
(74) *Attorney, Agent, or Firm* — Adams & Wilks

(57) ABSTRACT

A radiation analyzing apparatus includes a radiation irradiation unit configured to irradiate an object with a first radiation, a radiation detection unit configured to detect a second radiation generated from the object irradiated with the first radiation, a radiation converging unit configured to disposed between the object and the radiation detection unit and to converge the second radiation on the radiation detection unit, a position changing unit configured to vary a relative positional relationship between the radiation converging unit and the radiation detection unit, and a driving unit configured to change the positional relationship.

4 Claims, 10 Drawing Sheets

(56) References Cited

U.S. PATENT DOCUMENTS

| | | | | |
|---|---|---|---|---|
| 2006/0226340 A1* | 10/2006 | Sasayama | G01N 23/2252 | 250/208.1 |
| 2007/0291902 A1* | 12/2007 | Tanaka | G01T 1/006 | 378/162 |
| 2008/0056442 A1* | 3/2008 | Sasayama | G01N 23/223 | 378/45 |
| 2008/0212739 A1* | 9/2008 | Fukai | G01N 23/223 | 378/86 |
| 2010/0278303 A1* | 11/2010 | Grodzins | G01N 23/223 | 378/45 |
| 2011/0051894 A1* | 3/2011 | Takahara | G01N 23/223 | 378/86 |
| 2011/0064191 A1* | 3/2011 | Toth | H01J 37/256 | 378/53 |
| 2014/0048717 A1* | 2/2014 | Tanaka | G01T 1/16 | 250/395 |
| 2015/0177167 A1* | 6/2015 | Tanaka | G01N 23/20091 | 378/49 |

\* cited by examiner

RADIATION ANALYZING APPARATUS AND RADIATION ANALYZING METHOD

CROSS REFERENCE TO RELATED APPLICATION

This application is based upon and claims the benefit of priority of Japanese Patent Application No. 2016-059811 filed on Mar. 24, 2016, the contents of which are incorporated herein by reference in its entirety.

TECHNICAL FIELD

The present invention relates to a radiation analyzing apparatus and a radiation analyzing method.

BACKGROUND ART

The study and development of a technique for irradiating an object with radiation and analyzing the properties and structure of the object have been conducted.

In this regard, there is known a superconductive X-ray analyzing device in which a plurality of lenses for X-rays are disposed between a sample and a detector so that the sample, the plurality of lenses for X-rays, and the detector are arranged in a row in this order, and are disposed so that X-rays radiating from the sample are condensed into the detector through the plurality of lenses for X-rays, so that the lens for X-rays on a side closest to the sample is focused on the position of the sample, and so that the lens for X-rays on a side closest to the detector is focused on the position of the detector, the superconductive X-ray analyzing device having a structure in which an extremely low temperature portion having the detector mounted thereto is stored in a vacuum container without being drawn out onto a projection from a refrigerating machine (see Patent Document JP-A-2005-257349).

SUMMARY

However, in such a superconductive X-ray analyzing device, a user has to change a relative positional relationship between the lens for X-rays and the detector by his or her hand in a case of changing the positional relationship, and it may be difficult for the user to change the positional relationship to his or her desired positional relationship if the user is not skilled in changing the positional relationship. As a result, in the superconductive X-ray analyzing device, it may be difficult to improve X-rays detection efficiency of the detector.

The invention is contrived in view of such problems and an object thereof is to provide a radiation analyzing apparatus and a radiation analyzing method which are capable of easily improving radiation detection efficiency.

According to an aspect of the invention, there is provided a radiation analyzing apparatus including a radiation irradiation unit configured to irradiate an object with a first radiation, a radiation detection unit configured to detect a second radiation generated from the object irradiated with the first radiation, a radiation converging unit configured to be disposed between the object and the radiation detection unit and to converge the second radiation on the radiation detection unit, a position changing unit configured to vary a relative positional relationship between the radiation converging unit and the radiation detection unit, and a driving unit configured to drive the position changing unit to change the positional relationship.

According to the aspect of the invention, the radiation analyzing apparatus may be configured to include a first driving control unit configured to control the driving unit based on an operation received from a user.

According to the aspect of the invention, the radiation analyzing apparatus may be configured to include a counting rate calculation unit configured to calculate a counting rate of the second radiation detected by the radiation detection unit, and a second driving control unit configured to control the driving unit based on the counting rate calculated by the counting rate calculation unit.

According to the aspect of the invention, the radiation analyzing apparatus may be configured such that the radiation irradiation unit performs irradiation with an electron beam as the first radiation, and the radiation detection unit is a superconductive transition edge sensor detecting, as the second radiation, X-rays which is generated from the object irradiated with the electron beam.

According to another aspect of the invention, there is provided a radiation analyzing apparatus including a radiation converging unit configured to converge a second radiation which is generated from an object irradiated with first radiation, and a radiation detection unit configured to detect the second radiation, wherein the radiation analyzing apparatus moves the radiation converging unit with respect to the radiation detection unit based on a counting rate of the second radiation.

According to still another aspect of the invention, there is provided a radiation analyzing method including a first step of irradiating an object with a first radiation by a radiation irradiation unit, a second step of detecting a second radiation, which is generated from the object irradiated with the first radiation, by a radiation detection unit, a third step of converging the second radiation on the radiation detection unit by a radiation converging unit disposed between the object and the radiation detection unit, and a fourth step of causing a driving unit to drive a position changing unit to change a relative positional relationship between the radiation converging unit and the radiation detection unit, the position changing unit configured to vary the positional relationship.

According to the invention, it is possible to provide a radiation analyzing apparatus and a radiation analyzing method which are capable of easily improving radiation detection efficiency.

DESCRIPTION OF ILLUSTRATIVE EMBODIMENTS

Embodiment

Hereinafter, an embodiment of the invention will be described with reference to the accompanying drawings.
<Configuration of Radiation Analyzing Apparatus>
First, a configuration of a radiation analyzing apparatus 1 will be described.

Figure 1:
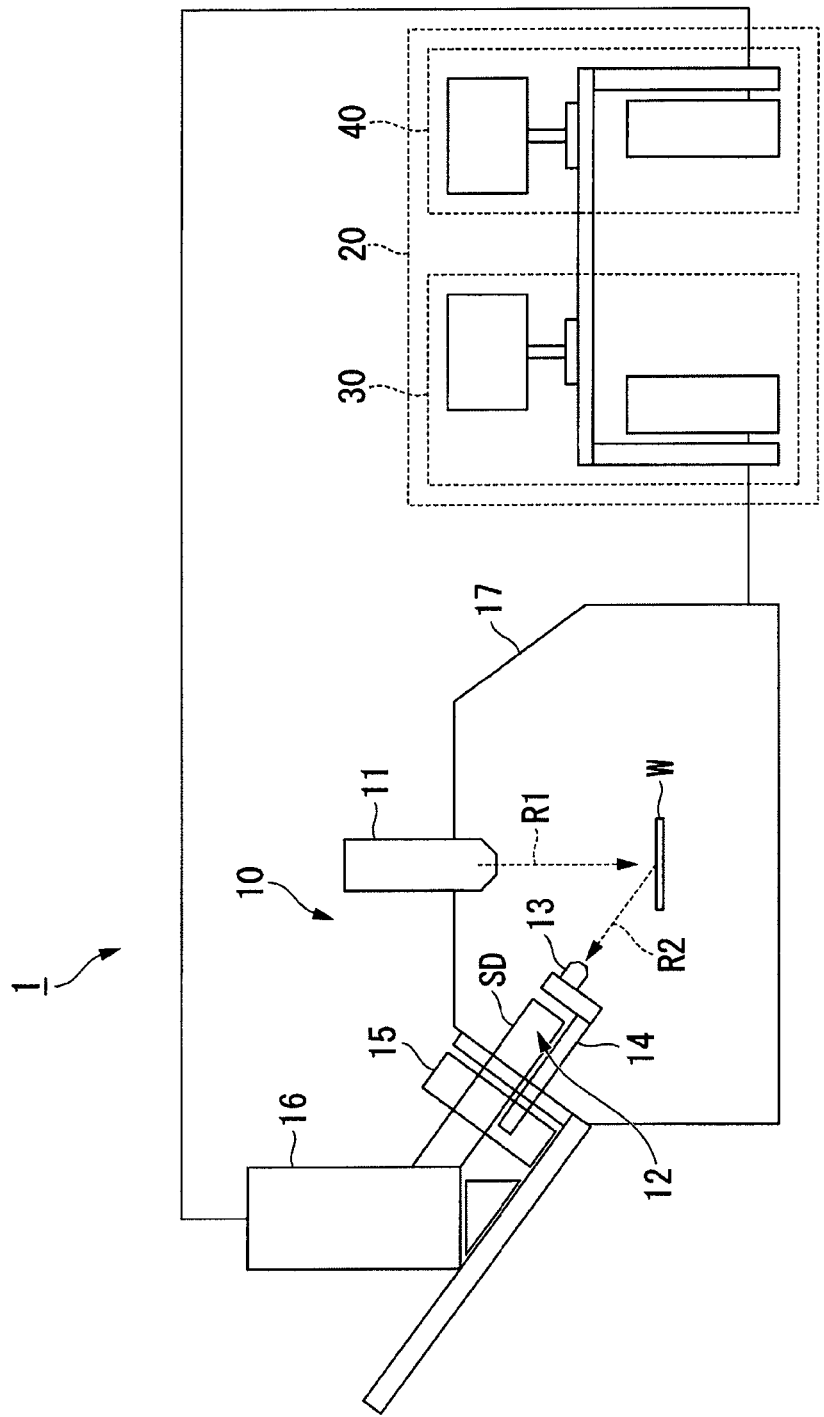
FIG. 1 is a diagram illustrating an example of a configuration of a radiation analyzing apparatus according to an embodiment.

FIG. 1 is a diagram illustrating an example of a configuration of the radiation analyzing apparatus 1 according to the embodiment.

The radiation analyzing apparatus 1 includes a detection device 10 and a control device 20.

The detection device 10 includes a radiation irradiation unit 11, a radiation detection unit 12, a radiation converging unit 13, a position changing unit 14, a driving unit 15, a cooling device 16 and a housing 17.

The radiation irradiation unit 11 irradiates an object with a first radiation R1. The radiation irradiation unit 11 is, for example, an electron gun. In this case, the first radiation R1 is an electron beam. Meanwhile, the radiation irradiation unit 11 may be a device irradiating an object with radiation, which is different from an electron beam such as X-rays as the first radiation R1, instead of the electron gun.

The radiation detection unit 12 detects a second radiation R2 which is generated from the object irradiated with the first radiation R1. The radiation detection unit 12 includes, for example, a superconductive transition edge sensor (TES), and detects the second radiation R2 by the superconductive transition edge sensor. Hereinafter, a description will be given of an example of a case where the second radiation R2 is characteristic X-rays such as fluorescent X-rays, which is generated from the object. That is, the radiation analyzing apparatus 1 is a superconductive X-ray analyzing device in this example. Meanwhile, the second radiation R2 may be another radiation instead of X-rays. In addition, the radiation detection unit 12 may be configured to detect the second radiation R2 by another detection element, instead of being configured to detect the second radiation R2 by the superconductive transition edge sensor.

Here, the superconductive transition edge sensor detects the second radiation R2 by changes in resistance generated when X-rays are made incident to a metal thin film in a superconductive state. In a case where X-rays are made incident to a metal thin film in a superconductive state, the temperature of the metal thin film rises, and the state of the metal thin film transitions to a normally conductive state from the superconductive state. At this time, electric resistance of the metal thin film sharply changes in proportion to energy (that is, the rising temperature of the metal thin film) of X-rays being made incident to the metal thin film (for example, changes in resistance is 0.1Ω or the like in a case where changes in temperature is several mK). The superconductive transition edge sensor detects the energy of the second radiation R2 by the magnitude of the changes in resistance by using the properties. In this manner, in a case where the energy of the second radiation R2 is detected, the radiation detection unit 12 outputs an electric signal, having a magnitude proportional to the detected energy, to the control device 20 as a detection information indicating that the second radiation R2 has been detected.

The radiation detection unit 12 is disposed inside a thermal shield SD. The thermal shield SD shields radiant heat from the outside of the thermal shield SD, and suppresses a rise in temperature inside the thermal shield SD. That is, the thermal shield SD suppresses a rise in the temperature of the radiation detection unit 12 by the radiant heat. Thereby, the superconductive state of the superconductive transition edge sensor included in the radiation detection unit 12 is held until X-rays are made incident to the superconductive transition edge sensor.

The radiation converging unit 13 is an optical member that converges (collects) the second radiation R2, which is generated from the object irradiated with the first radiation R1, on the radiation detection unit 12. More specifically, the radiation converging unit 13 converges the second radiation R2 so as to have a predetermined focal diameter at a predetermined focus distance. The radiation converging unit 13 is disposed between the object irradiated with the first radiation R1 by the radiation irradiation unit 11 and the radiation detection unit 12.

The position changing unit 14 is a mechanism member that varies a relative positional relationship between the radiation converging unit 13 and the radiation detection unit 12. The position changing unit 14 includes a stage ST on which, for example, the radiation converging unit 13 can be mounted. The stage ST can relatively move the radiation converging unit 13 with respect to the radiation detection unit 12. The radiation converging unit 13 is mounted on the stage ST. Meanwhile, the position changing unit 14 may be configured to include a stage on which the radiation detection unit 12 can be mounted. In this case, the stage can relatively move the radiation detection unit 12 with respect to the radiation converging unit 13.

The driving unit 15 moves the stage ST included in the position changing unit 14, and changes a relative positional relationship between the radiation converging unit 13 and the radiation detection unit 12. The driving unit 15 is, for example, an actuator that moves the stage ST. The driving unit 15 moves the stage ST based on a control signal acquired from the control device 20.

The cooling device 16 cools the inside of the thermal shield SD. Thereby, the cooling device 16 can set the superconductive transition edge sensor included in the radiation detection unit 12 disposed inside the thermal shield SD to be in a superconductive state.

The housing 17 is a housing of the detection device 10. In this example, an irradiation port through which the first radiation R1 is emitted from the radiation irradiation unit 11, an object irradiated with the first radiation R1 from the radiation irradiation unit 11, the radiation converging unit 13, the stage ST included in the position changing unit 14, and the radiation detection unit 12 disposed inside the thermal shield SD are disposed inside the housing 17. In the example illustrated in FIG. 1, an object W is disposed inside the housing 17 as an object irradiated with the first radiation R1. The object W may be any object as long as the object is a sample of a desired object for which a user wants to analyze the properties and structure thereof. Meanwhile, the housing 17 may be configured such that the driving unit 15 is disposed therein in addition to these components. The inside of the housing 17 is set to be in a vacuum state by a vacuum pump not shown in the drawing.

The detection device 10 is communicably connected to the control device 20 by a cable. Thereby, each of the radiation irradiation unit 11, the radiation detection unit 12, the driving unit 15, and the cooling device 16 included in the detection device 10 performs an operation based on a control signal acquired from the control device 20. Meanwhile, wired communication through the cable is performed by a standard such as Ethernet (registered trademark) or a universal serial bus (USB). In addition, the detection device 10 may be configured to be connected to the control device 20 by wireless communication performed by a communication standard such as Wi-Fi (registered trademark).

The control device 20 includes a first control device 30 and a second control device 40. In this example, the control device 20 is constituted by the first control device 30 and the second control device 40 formed separately from the first control device 30, but may be alternatively constituted by the first control device 30 integrally formed with the second control device 40 or the second control device 40 integrally formed with the first control device 30. In this case, the control device 20 has a function of the first control device 30 and a function of the second control device 40.

The first control device 30 is an information processing apparatus such as a desktop personal computer (PC), a notebook PC, or a workstation. Meanwhile, the first control device 30 may be alternatively another information processing apparatus such as a tablet PC, a multi-functional mobile phone, or a personal data assistant (PDA). The first control device 30 causes the radiation irradiation unit 11 to irradiate with the first radiation R1. The cooling device 16 cools the inside of the thermal shield SD by a cooling control device not shown in the drawing.

The second control device 40 is an information processing apparatus such as a desktop personal computer (PC), a notebook PC, or a workstation. Meanwhile, the second control device 40 may be alternatively another information processing apparatus such as a tablet PC, a multi-functional mobile phone, or a personal data assistant (PDA).

The second control device 40 acquires detection information from the radiation detection unit 12. The second control device 40 analyzes the properties and structure of an object irradiated with the first radiation R1 based on the acquired detection information. In addition, the second control device 40 controls the driving unit 15 and relatively moves the radiation converging unit 13, which is mounted on the stage ST included in the position changing unit 14, with respect to the radiation detection unit 12. Thereby, the second control device 40 can easily improve radiation detection efficiency.

Hereinafter, a description will be given in detail of a process in which the second control device 40 controls the driving unit 15 and causes the position changing unit 14 to change a relative positional relationship between the radiation converging unit 13 and the radiation detection unit 12.

<Hardware Configurations of First Control Device and Second Control Device>

Figure 2:
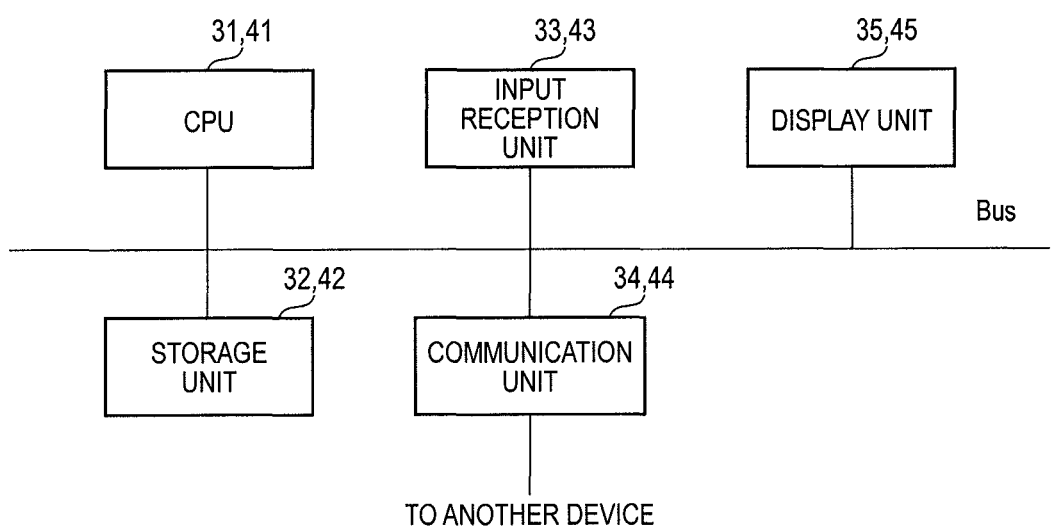
FIG. 2 is a diagram illustrating an example of hardware configurations of a first control device and a second control device.

Hereinafter, hardware configurations of the first control device 30 and the second control device 40 will be described with reference to FIG. 2. FIG. 2 is a diagram illustrating an example of hardware configurations of the first control device 30 and the second control device 40. FIG. 2 is a diagram conveniently illustrating the hardware configuration (functional units having a numeral in the 30s attached thereto in FIG. 2) of the first control device 30 and the hardware configuration (functional units having a numeral in the 40s attached thereto in FIG. 2) of the second control device 40 in an overlapping manner.

The first control device 30 includes, for example, a CPU (central processing unit) 31, a storage unit 32, an input reception unit 33, a communication unit 34, and a display unit 35. In addition, the first control device 30 communicates with other devices through the communication unit 34. These components are communicably connected to each other through a bus Bus.

The second control device 40 includes, for example, a CPU 41, a storage unit 42, an input reception unit 43, a communication unit 44, and a display unit 45. In addition, the second control device 40 communicates with other devices through the communication unit 44. These components are communicably connected to each other through the bus Bus.

The CPU 31 executes various programs stored in the storage unit 32.

The storage unit 32 includes, for example, a HDD (hard disk drive), a SSD (solid state drive), an EEPROM (electrically erasable programmable read-only memory), a ROM (read-only memory), a RAM (random access memory), or the like. Meanwhile, the storage unit 32 may be an external storage device which is connected by a digital input and output port, such as a USB, instead of being built into the first control device 30. The storage unit 32 stores various pieces of information, images, and various programs which are processed by the first control device 30.

The input reception unit 33 is an input device such as a keyboard, a mouse, or a touch pad. Meanwhile, the input reception unit 33 is another input device, such as a touch panel, which is integrally formed with the display unit 35.

The communication unit 34 is configured to include a digital input and output port, such as a USB, an Ethernet (registered trademark) port, or the like.

The display unit 35 is, for example, a liquid crystal display panel or an organic EL (electroluminescence) display panel.

The CPU 41 executes various programs stored in the storage unit 42.

The storage unit 42 includes, for example, a HDD, an SSD, an EEPROM, a ROM, a RAM, or the like. Meanwhile, the storage unit 42 may be an external storage device connected to a digital input and output port, such as a USB, or the like instead of being built into the second control device 40. The storage unit 42 is a table that stores various pieces of information, images, and various programs which are processed by the second control device 40.

The input reception unit 43 is an input device such as a keyboard, a mouse, or a touch pad. Meanwhile, the input reception unit 43 may be another input device such as a touch panel which is integrally formed with the display unit 45.

The communication unit 44 is configured to include a digital input and output port, such as a USB, an Ethernet (registered trademark) port, or the like.

The display unit 45 is, for example, a liquid crystal, display panel or an organic EL display panel.

<Functional Components of First Control Device and Second Control Device>

Figure 3:
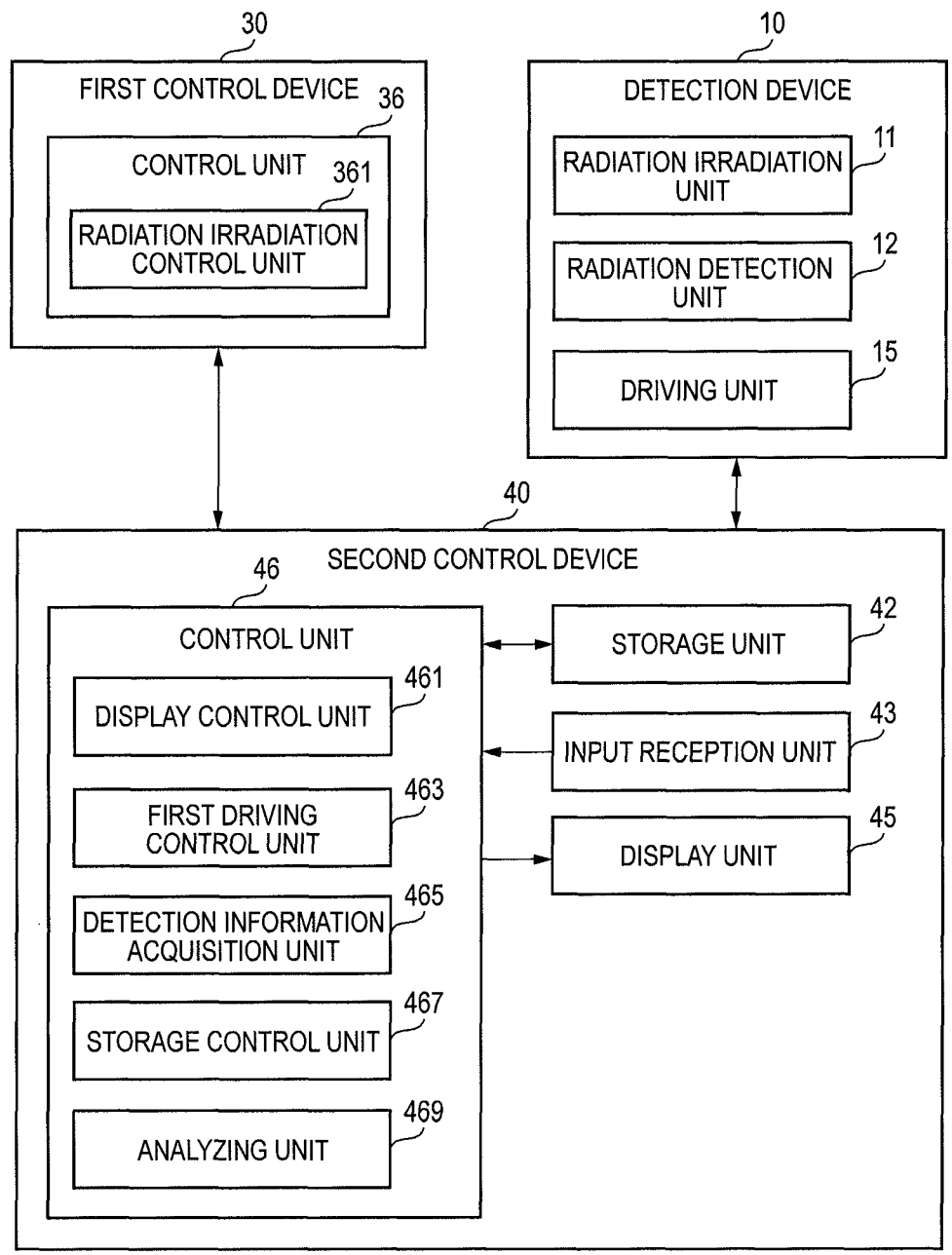
FIG. 3 is a diagram illustrating an example of functional components of the first control device and the second control device.

Hereinafter, functional components of the first control device 30 and the second control device 40 will be described with reference to FIG. 3. FIG. 3 is a diagram illustrating an example of functional components of the first control device 30 and the second control device 40.

The first control device 30 includes a control unit 36.

The control unit 36 controls the overall first control device 30. The control unit 36 includes a radiation irradiation control unit 361. The functional unit included in the control unit 36 is realized, for example, by the CPU 31 executing various programs stored in the storage unit 32. In addition, a portion or all of the functional units may be hardware functional units such as a LSI (large scale integration) or an ASIC (application specific integrated circuit).

The radiation irradiation control unit 361 causes the radiation irradiation unit 11 to irradiate with the first radiation R1 based on an operation received by a user.

The second control device 40 includes the storage unit 42, the input reception unit 43, the display unit 45, and a control unit 46.

The control unit 46 controls the overall second control device 40. The control unit 46 includes a display control unit 461, a first driving control unit 463, a detection information acquisition unit 465, a storage control unit 467, and an analyzing unit 469. The functional units included in the control unit 46 are realized, for example, by the CPU 41 executing various programs stored in the storage unit 42. In addition, a portion or all of the functional units may be hardware functional units such as an LSI or an ASIC.

The display control unit 461 generates various screens based on an operation received from a user. The display control unit 461 displays the generated screens on the display unit 45.

The first driving control unit 463 controls the driving unit 15 based on an operation received from a user.

The detection information acquisition unit 465 acquires detection information from the radiation detection unit 12 included in the detection device 10.

The storage control unit 467 stores the detection information acquired by the detection information acquisition unit 465 in the storage unit 42.

The analyzing unit 469 analyzes the properties and structure of an object W based on the detection information stored in the storage unit 42 by the storage control unit 467.

<Specific Example of Processing Performed by Second Control Device>

Figure 4:
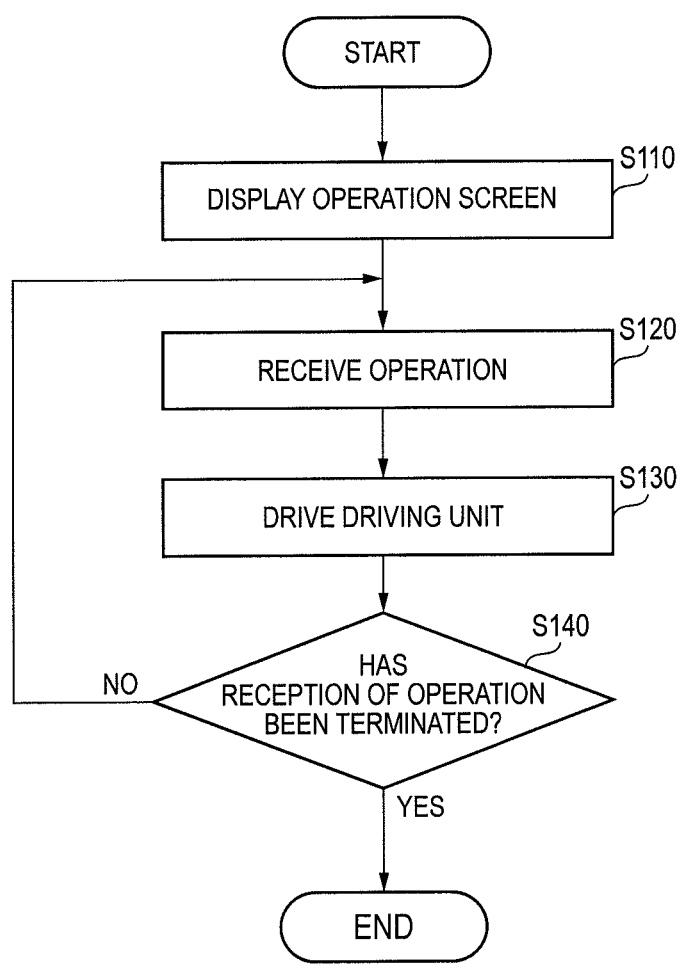
FIG. 4 is a flow chart illustrating an example of a flow of processing performed by the second control device.

Hereinafter, a specific example of processing performed by the second control device 40 will be described with reference to FIG. 4. FIG. 4 is a flow chart illustrating an example of a flow of processing performed by the second control device 40. Hereinafter, a description will be given of a case where an object W is disposed in advance, at a predetermined arrangement position which is irradiated with the first radiation R1 from the radiation irradiation unit 11 inside the housing 17.

The display control unit 461 generates an operation screen that receives a user's operation for changing a relative positional relationship between the radiation converging unit 13 and the radiation detection unit 12, based on the operation received from the user. The display control unit 461 displays the generated operation screen on the display unit 45 (step S110).

Next, the first driving control unit 463 receives a user's operation from the operation screen displayed on the display unit 45 in step S110 (step S120). The operation is to input the amount of movement and a movement direction of the stage ST, included in the position changing unit 14, which is moved by the driving unit 15 to the second control device 40.

Next, the first driving control unit 463 controls the driving unit 15 based on the operation received in step S120 (step S130). Specifically, the first driving control unit 463 controls the driving unit 15 so that the stage ST included in the position changing unit 14 moves in the movement direction, which is input by the operation received in step S120, by the amount of movement which is input by the operation.

Next, the first driving control unit 463 determines whether or not an operation of terminating the reception of a user's operation has been received from the operation screen displayed on the display unit 45 in step S110 (step S140). In a case where it is determined that the operation of terminating the reception of a user's operation has not been received (step S140; NO), the first driving control unit 463 transitions to step S120 and receives a user's operation from the operation screen again. On the other hand, in a case where the first driving control unit 463 determines that the operation of terminating the reception of a user's operation has been received (step S140; YES), the first driving control unit 463 terminates the processing.

<Specific Example of Movement of Stage by Driving of Driving Unit>

Figure 5:
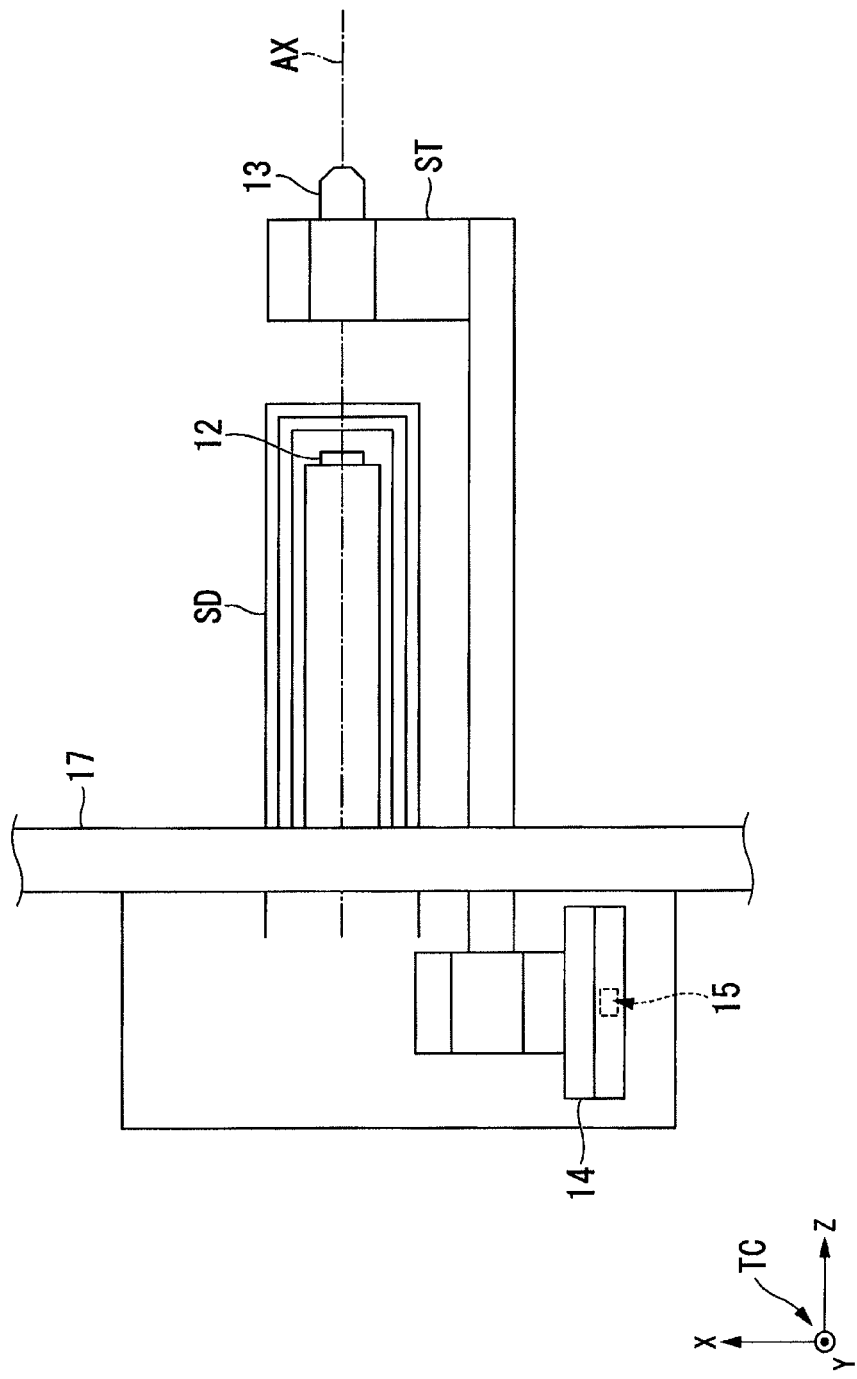
FIG. 5 is a diagram illustrating an example of a relative positional relationship between a radiation detection unit and a radiation converging unit mounted on a stage included in a position changing unit.

Hereinafter, a specific example of the movement of the stage ST by the driving of the driving unit 15 will be described with reference to FIG. 5. FIG. 5 is a diagram illustrating an example of a relative positional relationship between the radiation detection unit 12 and the radiation converging unit 13 mounted on the stage ST included in the position changing unit 14. FIG. 5 illustrates a side view in a case where the positional relationship is seen from the positive direction toward the negative direction of a Y-axis in a radiation detection unit coordinate system TC. The radiation detection unit coordinate system TC is a three-dimensional local coordinate system indicating the position of the radiation converging unit 13 with respect to the radiation detection unit 12. The position of the radiation converging unit 13 means, for example, the center of gravity of the radiation converging unit 13. Meanwhile, the position of the radiation converging unit 13 may be alternatively another position corresponding to the radiation converging unit 13.

In the example illustrated in FIG. 5, the Z-axis direction of the radiation detection unit coordinate system TC conforms to an AX direction of an optical axis of the radiation detection unit 12. In addition, the Y-axis direction in the radiation detection unit coordinate system TC is a direction perpendicular to the Z-axis. In addition, the X-axis direction in the radiation detection unit coordinate system TC is a direction perpendicular to the Z-axis and the Y-axis.

The driving unit 15 in this example is disposed outside the housing 17 as illustrated in FIG. 5. The driving unit 15 acquires a control signal including information indicating a movement direction and the amount of movement from the first driving control unit 463 in step S130 illustrated in FIG. 4. The driving unit 15 moves the stage ST in the movement direction indicated by the information included in the acquired control signal by the amount of movement indicated by the information. In this example, the driving unit 15 moves the stage ST in each of the X-axis direction, the Y-axis direction, and the Z-axis direction of the radiation detection unit coordinate system TC. In addition, the driving unit 15 moves the stage ST by moving a member (mechanism) connecting the driving unit 15 disposed outside the housing 17 and the stage ST disposed inside the housing. Thereby, the second control device 40 can change the relative positional relationship between the radiation converging unit 13 and the radiation detection unit 12 to a positional relationship which is desired by a user. As a result, the second control device 40 can easily improve detection efficiency of the detection of the second radiation R2 by the superconductive transition edge sensor included in the radiation detection unit 12.

First Modification Example of Embodiment

Hereinafter, a first modification example of the embodiment will be described with reference to FIG. 6. Meanwhile, in the first modification example of the embodiment, the same components as those in the embodiment will be denoted by the same reference numerals and signs, and a description thereof will not be repeated. In a detection device 10 according to the first modification example of the embodiment, a driving unit 15 is disposed inside a housing 17 as illustrated in FIG. 6.

Figure 6:
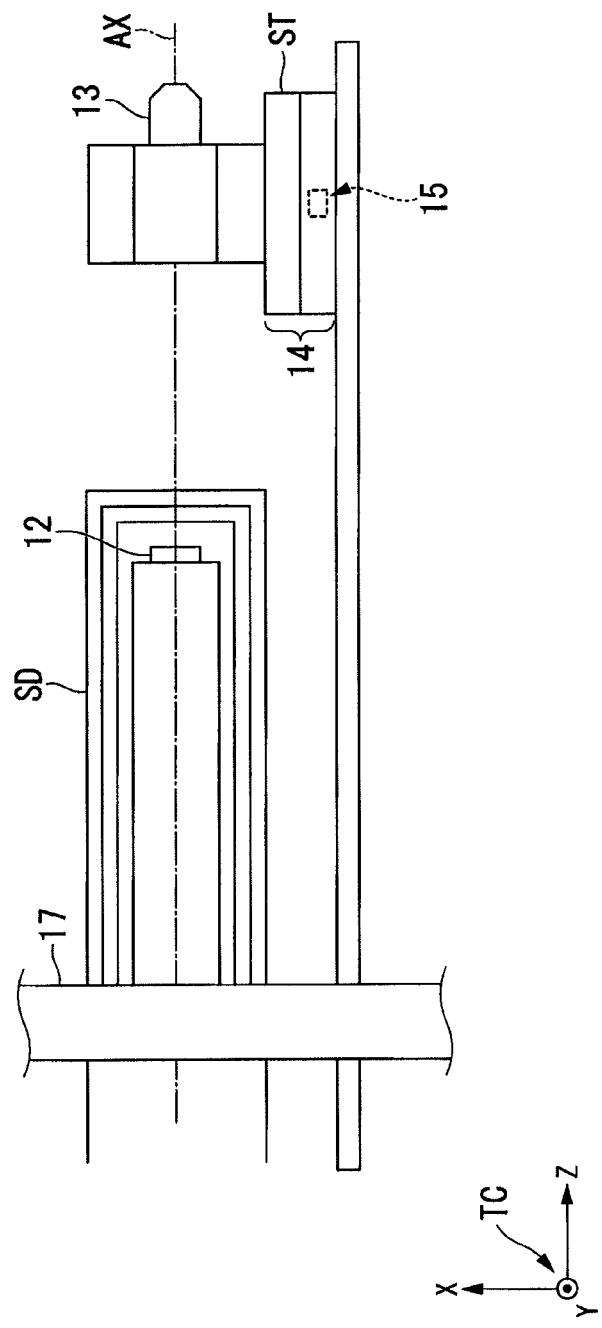
FIG. 6 is a diagram illustrating an example of a relative positional relationship between a radiation converging unit, which is mounted on a stage included in a position changing unit, and a radiation detection unit.

FIG. 6 is a diagram illustrating an example of a relative positional relationship between a radiation detection unit 12 and a radiation converging unit 13 which is mounted on a stage ST included in a position changing unit 14. FIG. 6 illustrates a side view in a case where the positional relationship is seen from the positive direction toward the negative direction of a Y-axis in a radiation detection unit coordinate system TC.

In the example illustrated in FIG. 6, the Z-axis direction of the radiation detection unit coordinate system TC conforms to an AX direction of an optical axis of the radiation detection unit 12. In addition, the Y-axis direction in the radiation detection unit coordinate system TC is a direction perpendicular to the Z-axis. In addition, the X-axis direction in the radiation detection unit coordinate system TC is a direction perpendicular to the Z-axis and the Y-axis.

In the example illustrated in FIG. 6, the driving unit 15 is disposed on the lower side of the stage ST included in the position changing unit 14. The lower side is in the negative direction of the X-axis in the radiation detection unit coordinate system TC. The driving unit 15 acquires a control signal including information indicating a movement direction and the amount of movement from the first driving control unit 463 in step S130 illustrated in FIG. 4. The driving unit 15 moves the stage ST in the movement direction indicated by the information included in the acquired control signal by the amount of movement which is indicated by the information. In this example, the driving unit 15 moves the stage ST in each of the X-axis direction, the Y-axis direction, and the Z-axis direction of the radiation detection unit coordinate system TC. Thereby, the second control device 40 can change the relative positional relationship between the radiation converging unit 13 and the radiation detection unit 12 to a positional relationship which is desired by a user. As a result, the second control device 40 can easily improve detection efficiency of the detection of the second radiation R2 by the superconductive transition edge sensor included in the radiation detection unit 12.

In addition, as illustrated in FIG. 6, in a case where the driving unit 15 is disposed on the lower side of the stage ST, a small number of members are disposed between the driving unit 15 and the stage ST, and the length of the member becomes smaller, thereby reducing errors caused by the rigidity of the members and the attachment of the members. The errors mean regarding the movement direction and the amount of movement indicated by the information included in the control signal acquired by the driving unit 15. Thereby, the second control device 40 can more reliably change the relative positional relationship between the radiation converging unit 13 and the radiation detection unit 12 to a positional relationship which is desired by a user.

Second Modification Example of Embodiment

Figure 7:
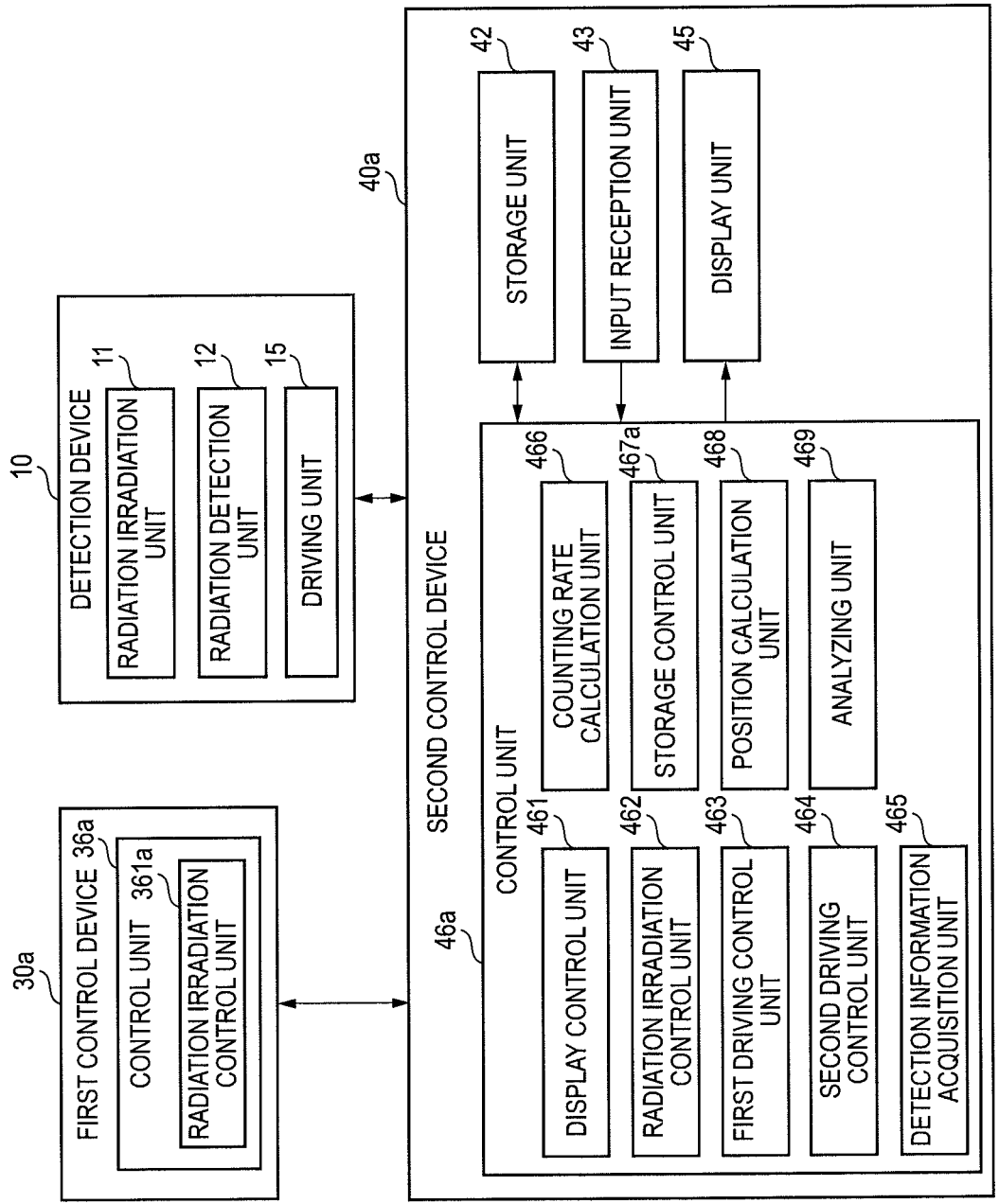
FIG. 7 is a diagram illustrating an example of functional components of a first control device and a second control device.

Hereinafter, a second modification example of the embodiment will be described with reference to FIGS. 7 to 9. Meanwhile, in the second modification example of the embodiment, the same components as those in the embodiment will be denoted by the same reference numerals and signs, and a description thereof will not be repeated.

A radiation analyzing apparatus 1a according to the second modification example of the embodiment includes a detection device 10 and a control device 20a. The control device 20a includes a first control device 30a and a second control device 40a. In the radiation analyzing apparatus 1a, the second control device 40a controls a driving unit 15 based on detection information acquired by a detection information acquisition unit 465 from a radiation detection unit 12, instead of driving the driving unit 15 based on an operation received from a user. Meanwhile, a hardware configuration of the first control device 30a is the same as the hardware configuration of the first control device 30, and thus a description thereof will not be repeated. In addition, a hardware configuration of the second control device 40a is the same as the hardware configuration of the second control device 40, and thus a description thereof will not be repeated.

<Functional Components of First Control Device and Second Control Device>

Hereinafter, functional components of the first control device 30a and the second control device 40a will be described with reference to FIG. 7. FIG. 7 is a diagram illustrating an example of the functional components of the first control device 30a and the second control device 40a.

The first control device 30a includes a control unit 36a.

The control unit 36a controls the overall first control device 30a. The control unit 36a includes a radiation irradiation control unit 361a. The functional unit included in the control unit 36a is realized, for example, by a CPU 31 executing various programs stored in a storage unit 32. In addition, a portion or all of the functional units may be hardware functional units such as an LSI or an ASIC.

The radiation irradiation control unit 361a causes a radiation irradiation unit 11 to irradiate with first radiation R1 based on an operation received by a user. In addition, the radiation irradiation control unit 361a causes the radiation irradiation unit 11 to irradiate with the first radiation R1 based on a control signal acquired from the second control device 40a.

The second control device 40a includes a storage unit 42, an input reception unit 43, a display unit 45, and a control unit 46a.

The control unit 46a controls the overall second control device 40a. The control unit 46a includes a display control unit 461, a radiation irradiation control unit 462, a first driving control unit 463, a second driving control unit 464, a detection information acquisition unit 465, a counting rate calculation unit 466, a storage control unit 467a, a position calculation unit 468, and an analyzing unit 469. These functional units included in the control unit 46a are realized, for example, by a CPU 41 executing various programs stored in the storage unit 42. In addition, a portion or all of the functional units may be hardware functional units such as an LSI or an ASIC.

The radiation irradiation control unit 462 outputs a control signal including information for performing a process of causing the radiation irradiation unit 11 to perform irradiation with the first radiation R1, to the radiation irradiation control unit 361*a*.

The second driving control unit 464 controls the driving unit 15 based on a position calculated by the position calculation unit 468, and moves the radiation converging unit 13 to the position. In addition, the second driving control unit 464 controls the driving unit 15 based on measurement position information indicating a plurality of measurement positions stored in the storage unit 42 in advance. The measurement positions are to perform measurement for determining a position at which second radiation R2 is converged on the radiation converging unit 13. In addition, the measurement positions are in the radiation detection unit coordinate system TC of the radiation converging unit 13.

The counting rate calculation unit 466 calculates a counting rate, which is the number of times of detection of the second radiation R2 per unit time, for each position of the radiation converging unit 13 based on detection information stored in the storage unit 42 for each position of the radiation converging unit 13 by the storage control unit 467. In this example, the unit time is one second. Meanwhile, the unit time may be alternatively another unit time such as one minute, ten minutes, or one hour.

The storage control unit 467*a* stores detection information acquired by the detection information acquisition unit 465 in the storage unit 42 for each position of the radiation converging unit 13 which is moved by the second driving control unit 464.

The position calculation unit 468 calculates a position at which the second radiation R2 is converged on the radiation converging unit 13, based on the counting rates calculated for each position of the radiation converging unit 13 by the counting rate calculation unit 466. The said position means a position where the radiation converging unit 13 is to be disposed for analyzing the properties and structure of an object W, is defined by a relative position of the relative radiation converging unit 13 with respect to the radiation detection unit 12.

<Specific Example of Processing Performed by Second Control Device>

Hereinafter, a specific example of processing performed by the second control device 40*a* will be described with reference to FIG. 8. FIG. 8 is a flow chart illustrating an example of a flow of processing performed by the second control device 40*a*. Hereinafter, a description will be given of a case where an object W is disposed in advance, at a predetermined arrangement position which is irradiated with the first radiation R1 from the radiation irradiation unit 11 inside the housing 17.

The second driving control unit 464 reads out measurement position information stored in the storage unit 42 in advance (step S210). Next, the second driving control unit 464 repeatedly performs the processes of step S230 to step S270 for each of a plurality of measurement positions indicated by the measurement position information which is read out from the storage unit 42 in step S210 (step S220). Meanwhile, there is a difference in at least one of a position in the X-axis direction of the radiation detection unit coordinate system TC, a position in the Y-axis direction of the radiation detection unit coordinate system TC, and a position in the Z-axis direction of the radiation detection unit coordinate system TC between the each of the measurement position.

The second driving control unit 464 controls the driving unit 15 to make the position of the radiation converging unit 13 conform to the measurement positions selected in step S220 (step S230). Next, the radiation irradiation control unit 462 outputs a control signal including information for performing a process of causing the radiation irradiation unit 11 to perform irradiation with the first radiation R1, to the radiation irradiation control unit 361*a*. Thereby, the radiation irradiation control unit 462 causes the radiation irradiation unit 11 to start irradiating the object W with the first radiation R1 (step S240).

Next, the detection information acquisition unit 465 starts performing a process of acquiring detection information from the radiation detection unit 12 whenever the radiation detection unit 12 detects the second radiation R2 (step S250). In a case where the detection information acquisition unit 465 acquires the detection information in the process, the storage control unit 467*a* stores information indicating the measurement positions selected in step S220 in the storage unit 42 corresponding to the acquired detection information. The detection information acquisition unit 465 continues the process started in step S250 until a measurement time elapses (step S260).

The measurement time means to execute an examination for determining a position of the second radiation R2 being converged on the radiation converging unit 13 is performed at each of the measurement positions selected in step S220. The measurement time is, for example, one minute. Meanwhile, the measurement time may be a time shorter than one minute or may be a time longer than one minute. In addition, the measurement time is clocked by a clocking unit not shown in the drawing. The clocking unit is a functional unit included in the control unit 46*a*.

In a case where the measurement time elapses in step S260 (step S260; YES), the radiation irradiation control unit 462 outputs a control signal including information for stopping a process of causing the radiation irradiation unit 11 to perform irradiation with the first radiation R1, to the radiation irradiation control unit 361*a*. The counting rate calculation unit 466 reads out pieces of detection information, which correspond to the information indicating the measurement positions selected in step S220, from the storage unit 42. The pieces of detection information are stored in the storage unit 42 by the storage control unit 467*a* in the processes of step S250 to step S260. The counting rate calculation unit 466 calculates a counting rate based on the pieces of detection information which are read out from the storage unit 42 (step S270). More specifically, the counting rate calculation unit 466 divides the number of pieces of detection information by the measurement time to thereby calculate the number of times of the detection of the second radiation R2 per unit time as a counting rate. The storage control unit 467*a* stores the calculated counting rate and information indicating the measurement positions selected in step S220 in the storage unit 42 corresponding to each other.

In this manner, the processes of step S220 to step S270 are repeatedly performed, and thus the second control device 40*a* can calculate the counting rate corresponding to each of the measurement positions.

Next, the position calculation unit 468 reads out the counting rates which are stored in the storage unit 42 and correspond to the respective measurement positions. The position calculation unit 468 calculates a position where the radiation converging unit 13 is to converge the second radiation R2, based on the read-out counting rates (step S280). In this example, the position calculation unit 468 calculates (specifies) the measurement position corresponding to the counting rate having the largest value among the read-out counting rates as a position where the radiation converging unit 13 is to converge the second radiation R2. The second driving control unit 464 controls the driving unit 15 to make the position of the radiation converging unit 13 conform to the position calculated in step S280 (step S290), and terminates the processing.

In this manner, the second control device 40a controls the driving unit 15 based on the pieces of detection information acquired from the radiation detection unit 12 by the detection information acquisition unit 465. Thereby, the second control device 40a can change the relative positional relationship between the radiation converging unit 13 and the radiation detection unit 12 to a positional relationship which is desired by a user, that is, a positional relationship with high detection efficiency of the radiation detection unit 12 without receiving an operation of moving the stage ST from the user.

Meanwhile, the counting rate calculation unit 466 may be configured to calculate a detection frequency obtained by summing up the number of read-out pieces of detection information, instead of being configured to calculate a counting rate based on the pieces of detection information which are read out in step S270. In this case, the position calculation unit 468 calculates (specifies) the measurement position corresponding to the detection frequency with the largest value in step S280, as a position where the radiation converging unit 13 is to converge the second radiation R2.

In addition, the position calculation unit 468 may be configured to calculate a statistic based on the read-out counting rates at the time of calculating the position where the radiation converging unit 13 is to converge the second radiation R2 in step S280, and to calculate the position where the radiation converging unit 13 is to converge the second radiation R2, based on the calculated statistic. For example, the position calculation unit 468 may be configured to calculate a maximum value of a regression curve based on the counting rates which are read out in step S280, as the statistic, and to calculate a position corresponding to the calculated maximum value as the position where the radiation converging unit 13 to converge the second radiation R2.

Figure 9:
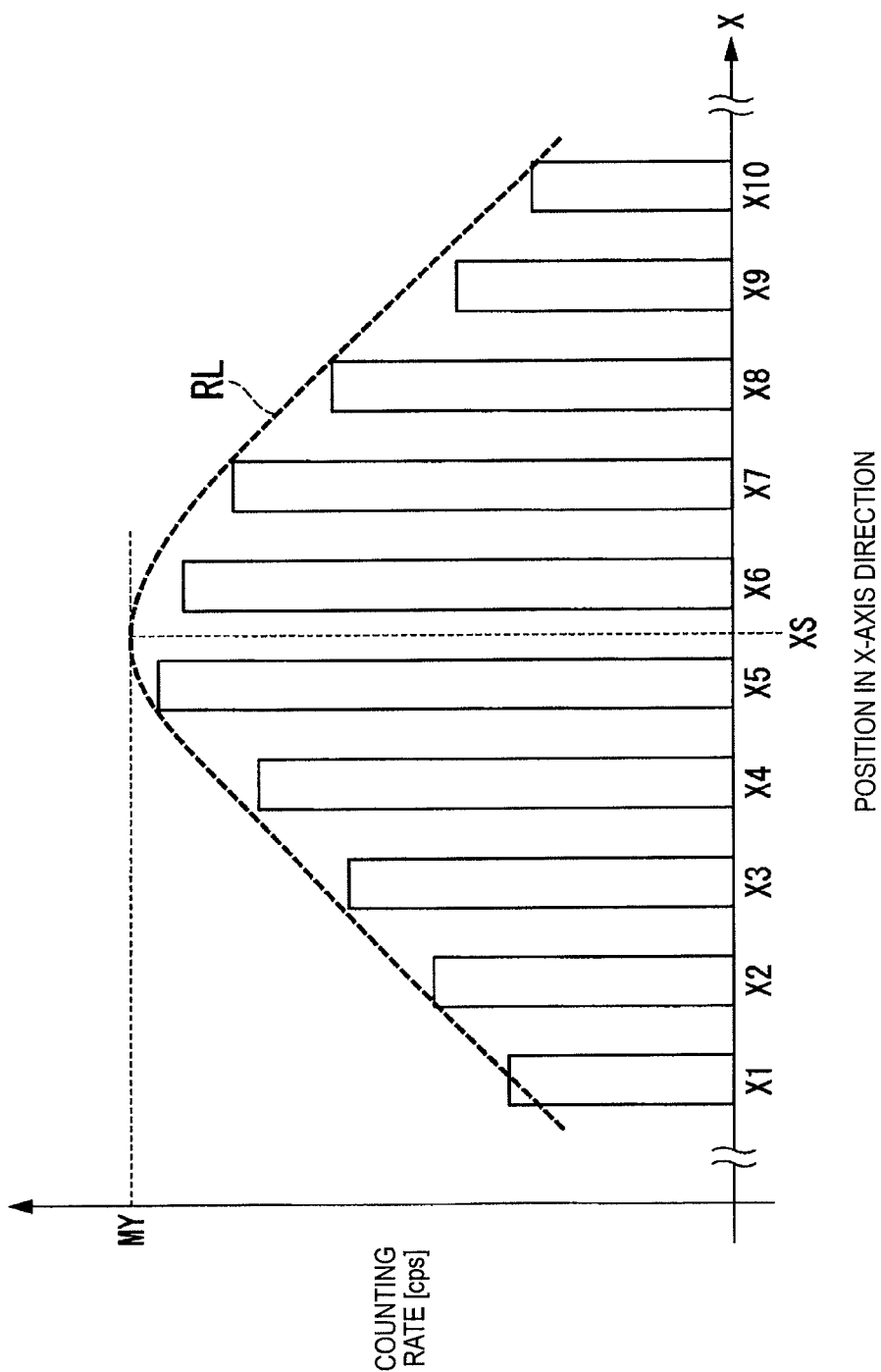
FIG. 9 is a diagram illustrating an example of a histogram of counting rates which are read out by a position calculation unit.

FIG. 9 is a diagram illustrating an example of a histogram of the counting rates which are read out by the position calculation unit 468 in step S280. In FIG. 9, a description will be given of an example of a method of calculating the position in the X-axis direction at which the second radiation R2 is converged on the radiation converging unit 13, based on the histogram indicating changes in a counting rate with respect to the position of the radiation converging unit 13 in the X-axis direction in the radiation detection unit coordinate system TC. Meanwhile, the position calculation unit 468 actually calculates a position in each of the X-axis direction, the Y-axis direction, and the Z-axis direction in the radiation detection unit coordinate system TC, the position where the radiation converging unit 13 is to converge the second radiation R2 by the calculation method described in FIG. 9.

The vertical axis in the histogram illustrated in FIG. 9 represents a counting rate. In addition, the horizontal axis in the histogram represents the position of the radiation converging unit 13 in the X-axis direction in the radiation detection unit coordinate system TC. Each of positions X1 to X10 represents a position in the X-axis direction at each measurement position. The position calculation unit 468 calculates a regression curve RL illustrated in FIG. 9 based on counting rates at the respective positions X1 to X10. The position calculation unit 468 calculates a maximum value MY in the calculated regression curve RL. The position calculation unit 468 calculates a position XS in the X-axis direction corresponding to the calculated maximum value MY as a position in the X-axis direction where the radiation converging unit 13 is to converge the second radiation R2.

Figure 8:
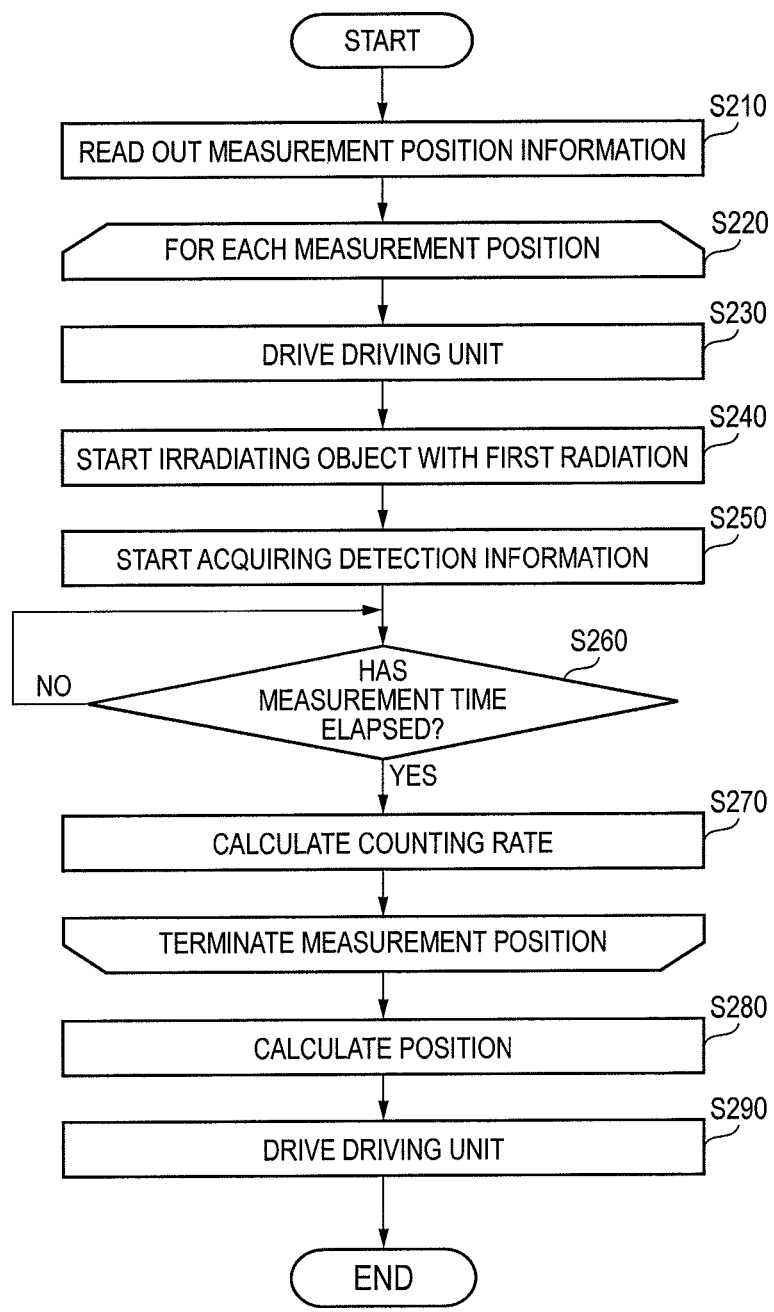
FIG. 8 is a flow chart illustrating an example of a flow of processing performed by the second control device.
Figure 10:
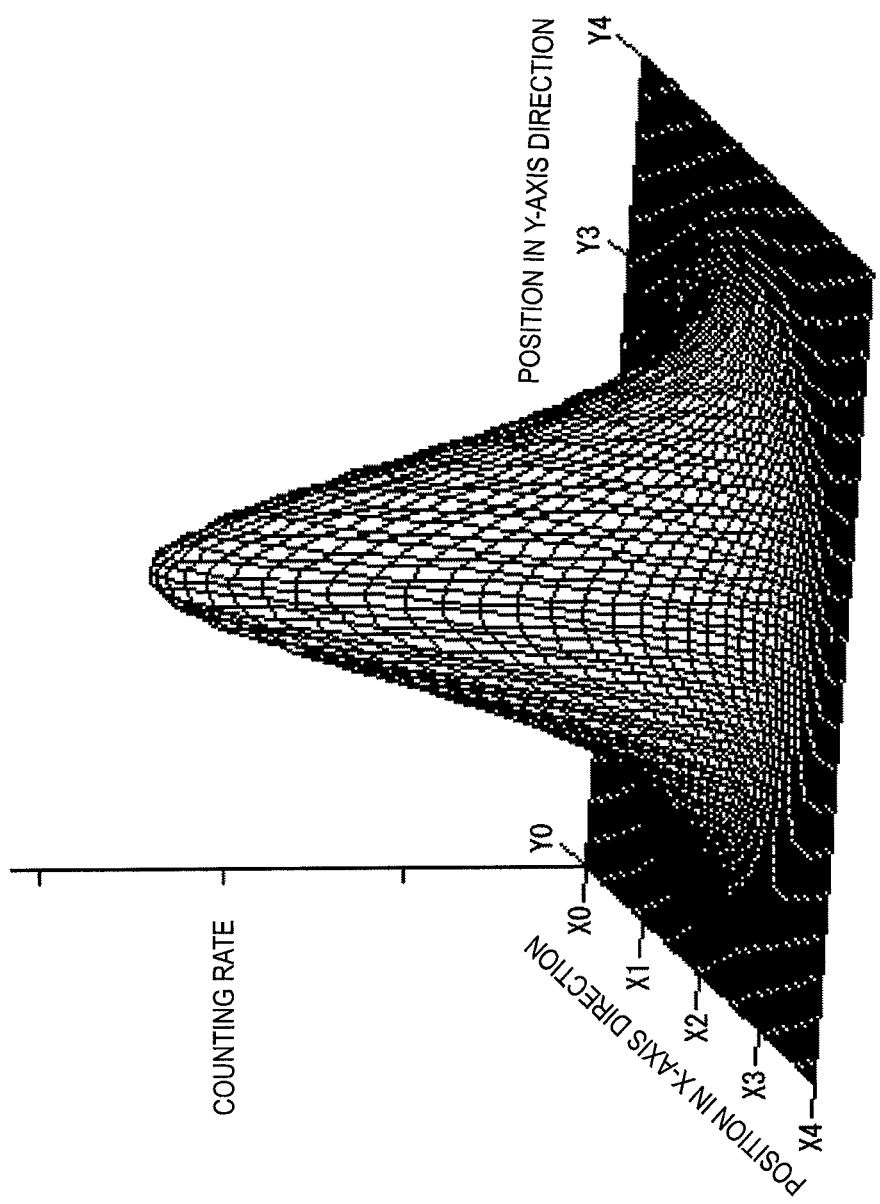
FIG. 10 is a diagram illustrating an example of a regression curve which is calculated on the basis of the histogram of the counting rates which are read out by the position calculation unit 468 in step S280.

Meanwhile, the second control device 40a may be configured to calculate a position in the X-axis direction and the Y-axis direction in the radiation detection unit coordinate system TC by the flow chart illustrated in FIG. 8, the position where the radiation converging unit 13 is to converge the second radiation R2, and then to specify a position having a maximum counting rate while moving (scanning) the stage ST at the position along the Z-axis direction by a predetermined amount of movement. In this case, the second control device 40a calculates a position corresponding to a maximum value in a three-dimensional graph illustrated in FIG. 10, as a position in the X-axis direction and the Y-axis direction by the method described in FIG. 9. FIG. 10 is a diagram illustrating an example of a regression curve calculated based on the histogram of the counting rates which are read out by the position calculation unit 468 in step S280.

In this manner, the second control device 40a calculates a statistic based on the read-out counting rates and calculates a position where the radiation converging unit 13 is to converge the second radiation R2, based on the calculated statistic, at the time of calculating the position where the radiation converging unit 13 is to converge the second radiation R2 in step S280. Thereby, the second control device 40a can more reliably change a relative positional relationship between the radiation converging unit 13 and the radiation detection unit 12 to a positional relationship which is desired by a user, that is, a positional relationship with high detection efficiency of the radiation detection unit 12, without receiving an operation of moving the stage ST from the user.

Another Modification Example of Embodiment

For example, the second control device 40a may be configured to display a virtual space virtually representing the inside of the housing 17 on the display unit 45, to receive a user's operation from the virtual space, and to change the position of the stage ST in the virtual space. The second control device 40a may be configured to control the driving unit 15 based on a movement direction and the amount of movement of the stage ST moving in the virtual space, and to change the relative positional relationship between the radiation converging unit 13 and the radiation detection unit 12.

In addition, the first driving control unit 463 may be configured to acquire information indicating a movement direction and the amount of movement at the time of moving the stage ST, from a multi-functional mobile phone terminal, a remote controller, or the like.

<Effects Obtained in Embodiment and Background Thereof>

An energy dispersion type X-ray detector and a wavelength dispersion type X-ray detector are known as an X-ray detector included in an X-ray analyzing device capable of discriminating between energies of X-rays. The energy dispersion type X-ray detector converts energy of X-rays being made incident to the energy dispersion type X-ray detector into an electric signal, and calculates the energy based on the magnitude of the converted electric signal. On the other hand, the wavelength dispersion type X-ray detector spectrally diffracts X-rays being made incident to the wavelength dispersion type X-ray detector to make the X-rays monochromatic, and detects the monochromatic X-rays by a proportional counter.

A semiconductor detector such as a lithium silicon type detector, a silicon drift type detector, and a germanium detector are known as the energy dispersion type X-ray detector. For example, the lithium silicon type detector or the silicon drift type detector is often used for an element analyzer of an electron microscope, and can detect energy of approximately 0 keV to 20 keV. However, since these detectors use silicon, energy resolution depends on a band gap (1.1 eV) of silicon, and it is difficult to improve the energy resolution to approximately 130 eV or greater, thereby deteriorating the energy resolution by 10 times or more as compared to that of the wavelength dispersion type X-ray detector.

In a case where X-rays are made incident to the energy dispersion type X-ray detector having an energy resolution of 130 eV, the energy dispersion type X-ray detector can detect the energy of the incident X-rays with an error of approximately 130 eV. Therefore, the energy resolution becomes higher as the error becomes smaller.

The superconductive X-ray analyzing device described as an example of the radiation analyzing apparatus 1 in the embodiment includes the superconductive transition edge sensor as a superconductive X-ray detector as described above. The superconductive transition edge sensor is a type of superconductive X-ray detector which is known as an energy dispersion type X-ray detector having an energy resolution at the same level as that of the energy resolution of the wavelength dispersion type X-ray detector. The superconductive transition edge sensor is also called a microcalorie meter. In addition to the superconductive transition edge sensor, a Josephson tunnel junction element using a Josephson effect, a superconductive single photon detecting element using a superconducting line, a superconducting mechanics inductance detector, and the like are known as the superconductive X-ray detector.

For example, the superconductive transition edge sensor has an energy resolution higher than those of other superconductive X-ray detectors. For example, the energy resolution of the superconductive transition edge sensor in a case of detecting the energy of characteristic X-rays of 5.9 keV can be set to 10 eV or less.

In a case where a superconductive transition edge sensor is mounted to a scanning electron microscope including an electron generation source such as a tungsten filament type, the energy of characteristic X-rays generated from an object irradiated with an electron beam is detected by the superconductive transition edge sensor, and thus it is possible to discriminate between characteristic X-rays (for example, Si-kα, W-Mα, or β) which are not discriminable by a semiconductor type X-ray detector.

In addition to the above-described energy resolution, counting efficiency is known as an index indicating characteristics of an X-ray detector. The counting efficiency is determined based on the area, thickness, and material of a radiation reception unit of the X-ray detector, a distance between a radiation generation source and the X-ray detector, a maximum counting rate of the X-ray detector, and the like. For example, a general silicon drift type detector has an area of several $mm^2$ to several hundreds of $mm^2$, and a maximum counting rate is several tens of thousands of cps to several hundreds of thousands of cps. On the other hand, the area of the superconductive transition edge sensor is generally smaller than 1 $mm^2$, and a maximum counting rate is approximately several hundreds of cps.

From this, as described in the embodiment, the radiation analyzing apparatus 1 including the superconductive transition edge sensor as a superconductive X-ray detector includes the position changing unit 14 and the driving unit 15, and it can be said that the radiation converging unit 13 being capable of being moved in a movement direction which is desired by a user, by the amount of movement which is desired by a user, by the driving unit 15 is extremely important in improving the counting efficiency of the radiation analyzing apparatus 1. In a case where the user manually changes the position of the relative radiation converging unit 13 with respect to the radiation detection unit 12, it is difficult to improve the counting efficiency. Such a difficulty can be easily understood from the fact that the second radiation R2 converged so as to have a diameter of up to approximately 200 μm by the radiation converging unit 13 has to be efficiently made incident to a light receiving unit having an area smaller than 1 $mm^2$.

As described above, the radiation analyzing apparatus in the embodiment (in this example, the radiation analyzing apparatus 1 or the radiation analyzing apparatus 1a) irradiates an object (in this example, the object W) with a first radiation (in this example, the first radiation R1) by a radiation irradiation unit (in this example, the radiation irradiation unit 11), detects a second radiation (in this example, the second radiation R2) which is generated from the object irradiated with the first radiation by a radiation detection unit (in this example, the radiation detection unit 12), converges the second radiation on a radiation detection unit by a radiation converging unit (in this example, the radiation converging unit 13) which is disposed between the object and the radiation detection unit, and drives a driving unit (in this example, the driving unit 15) which causes a position changing unit (in this example, the position changing unit 14), varying a relative positional relationship between the radiation converging unit and the radiation detection unit, to change the positional relationship. Thereby, the radiation analyzing apparatus can easily improve radiation detection efficiency.

In addition, the radiation analyzing apparatus drives the driving unit based on an operation received from a user. Thereby, the radiation analyzing apparatus can easily improve radiation detection efficiency based on an operation received from a user.

In addition, the radiation analyzing apparatus calculates a counting rate of the second radiation detected by the radiation detection unit, and drives the driving unit based on the calculated counting rate. Thereby, the radiation analyzing apparatus can easily improve radiation detection efficiency based on the counting rate of the second radiation detected by the radiation detection unit.

In addition, the radiation analyzing apparatus performs irradiation with an electron beam as the first radiation, and detects X-rays, as the second radiation, generated from the object irradiated with the electron beam by the superconductive transition edge sensor. Thereby, the radiation analyzing apparatus, which is a superconductive X-ray analyzing device, can easily improve radiation detection efficiency.

In addition, the radiation analyzing apparatus moves the radiation converging unit converging the second radiation, which is generated from the object irradiated with first radiation, on the radiation detection unit detecting the second radiation, based on the counting rate of the second radiation. Thereby, the radiation analyzing apparatus can easily improve radiation detection efficiency.

As described above, the embodiment of the invention has been described in detail with reference to the accompanying drawings. However, a specific configuration thereof is not limited to the embodiment, and may be modified, substituted, and deleted without departing from the scope of the invention.

In addition, a program for realizing the function of any component in the above-described device (for example, the control device 20) may be recorded in a computer-readable recording medium, and may be executed by being read by a computer system. Meanwhile, it is assumed that the wording "computer system" as used herein includes hardware such as an OS (operating system) or a peripheral device. In addition, the "computer-readable recording medium" means a portable medium such as a flexible disc, a magneto-optical disc, a ROM, or a CD (compact disk)-ROM, or a storage device such as a hard disk which is built into a computer system. Further, it is assumed that the "computer-readable recording medium" holds a program for a fixed period of time, like a volatile memory (RAM) inside a computer system serving as a server or a client in a case where the program is transmitted through a network such as the Internet or a communication line such as a telephone line.

In addition, the above-mentioned program may be transmitted to another computer system through a transmission medium or by transmission waves in the transmission medium, from a computer system in which the program is stored in a storage device or the like. Here, the "transmission medium" transmitting the program means a medium having a function of transmitting information, like a network (communication network) such as the Internet or a communication line such as a telephone line.

In addition, the above-mentioned program may be a program for realizing a portion of the above-described functions. Further, the above-mentioned program may be a so-called difference file (differential program) capable of realizing the above-described functions in combination with a program which is already recorded in a computer system.

What is claimed is:

1. A radiation analyzing apparatus comprising:
   a radiation irradiation unit configured to irradiate an object with a first radiation;
   a radiation detection unit configured to detect a second radiation generated from the object which is irradiated with the first radiation;
   a radiation converging unit configured to be disposed between the object and the radiation detection unit, the radiation converging unit configured to converge the second radiation on the radiation detection unit;
   a position changing unit configured to vary a relative positional relationship between the radiation converging unit and the radiation detection unit;
   a driving unit configured to drive the position changing unit to change the positional relationship;
   a counting rate calculation unit configured to calculate a counting rate of the second radiation detected by the radiation detection unit;
   a position calculation unit configured to calculate a maximum value of a regression curve based on the counting rate calculated by the counting rate calculation unit, and to calculate a position of the radiation converging unit with respect to the radiation detection unit based on the calculated maximum value; and
   a driving control unit configured to control the driving unit based on the position calculated by the position calculation unit.

2. The radiation analyzing apparatus according to claim 1, further comprising:
   another driving control unit configured to control the driving unit based on an operation received from a user.

3. The radiation analyzing apparatus according to claim 1,
   wherein the radiation irradiation unit performs irradiation with an electron beam as the first radiation, and
   wherein the radiation detection unit is a superconductive transition edge sensor detecting, as the second radiation, X-rays which is generated from the object by being irradiated with the electron beam.

4. A radiation analyzing method comprising:
   irradiating an object with a first radiation by a radiation irradiation unit;
   detecting a second radiation, which is generated from the object irradiated with the first radiation, by a radiation detection unit;
   converging the second radiation on the radiation detection unit by a radiation converging unit disposed between the object and the radiation detection unit;
   causing a driving unit to drive a position changing unit to change a relative positional relationship between the radiation converging unit and the radiation detection unit, the position changing unit configured to vary the positional relationship;
   calculating a counting rate of the second radiation detected by the radiation detection unit;
   calculating a maximum value of a regression curve based on the calculated counting rate;
   calculating a position of the radiation converging unit with respect to the radiation detection unit based on the calculated maximum value; and
   controlling the driving unit based on the calculated position.

* * * * *